: US008124279B2

(12) United States Patent
Petrat et al.

(10) Patent No.: US 8,124,279 B2
(45) Date of Patent: Feb. 28, 2012

(54) NANOSCALAR SILICON PARTICLES IN NEGATIVE ELECTRODE MATERIALS FOR USE IN LITHIUM-ION BATTERIES

(75) Inventors: Frank-Martin Petrat, Muenster (DE); Volker Hennige, Duelmen (DE); Evelyn Albrecht, Recklinghausen (DE); David Lee, Belle Mead, NJ (US); Hilmi Buqa, Brugg (CH); Michael Holzapfel, Munich (DE); Petr Novak, Brugg (CH)

(73) Assignee: Evonik Degussa GmbH, Essen (DE)

( * ) Notice: Subject to any disclaimer, the term of this patent is extended or adjusted under 35 U.S.C. 154(b) by 1174 days.

(21) Appl. No.: 10/594,995

(22) PCT Filed: Mar. 17, 2005

(86) PCT No.: PCT/EP2005/051238
§ 371 (c)(1),
(2), (4) Date: Jul. 26, 2007

(87) PCT Pub. No.: WO2005/096414
PCT Pub. Date: Oct. 13, 2005

(65) Prior Publication Data
US 2007/0281216 A1 Dec. 6, 2007

(30) Foreign Application Priority Data

Apr. 1, 2004 (DE) .......................... 10 2004 016 766

(51) Int. Cl.
*H01M 4/38* (2006.01)
*H01M 4/583* (2010.01)
*H01M 4/62* (2006.01)

(52) U.S. Cl. .................. 429/218.1; 429/231.8; 429/232; 252/182.1

(58) Field of Classification Search ........................ None
See application file for complete search history.

(56) References Cited

U.S. PATENT DOCUMENTS
7,776,304 B2 * 8/2010 Pridoehl et al. ............... 423/350
(Continued)

FOREIGN PATENT DOCUMENTS
WO   WO 2005/049492    *  6/2005

OTHER PUBLICATIONS
U.S. Appl. No. 11/908,458, filed Sep. 12, 2007, Petrat, et al.
(Continued)

*Primary Examiner* — Jonathan Crepeau
(74) *Attorney, Agent, or Firm* — Oblon, Spivak, McClelland, Maier & Neustadt, L.L.P.

(57) ABSTRACT

The invention relates to an electrode material for a lithium ion battery which is distinguished by the fact that the electrode material comprises
  5-85% by weight of nanoscale silicon particles which have a BET surface area of from 5 to 700 $m^2/g$ and a mean primary particle diameter of from 5 to 200 nm,
  0-10% by weight of conductive carbon black,
  5-80% by weight of graphite having a mean particle diameter of from 1 µm to 100 µm and
  5-25% by weight of a binder,
the proportions of the components summing to not more than 100% by weight, and to the use of the electrode material according to the invention for the production of lithium ion batteries, and to a lithium ion battery having a negative electrode which comprises the electrode material according to the invention.

18 Claims, 9 Drawing Sheets

U.S. PATENT DOCUMENTS

2002/0168576 A1* 11/2002 Hamamoto et al. .......... 429/331
2007/0094757 A1 4/2007 Pridoehl et al.
2007/0172406 A1 7/2007 Pridoehl et al.

OTHER PUBLICATIONS

José L. Tirado, "Inorganic materials for the negative electrode of lithium-ion batteries: state-of-the-art and future prospects", Materials Science and Engineering, R40, No. 3, Feb. 14, 2003, Cover page and pp. 103-136.
J. O. Besenhard, et al., "Will advanced lithium-alloy anodes have a chance in lithium-ion batteries?", Journal of Power Sources, vol. 68, 1997, pp. 87-90.
S. Bourderau, et al., "Amorphous silicon as a possible anode material for Li-ion batteries", Journal of Power Sources, vols. 81-82, 1999, pp. 233-236.
H. Buqa, et al., "Recent Improvements in Electrochemical Performance of Graphite Electrode for Lithium-Ion Batteries", ITE Letters on Batteries, New Technologies and Medicine, vol. 4, No. 1, 2003, pp. 38-43.
Nikolay Dimov, et al., "Carbon-coated silicon as anode material for lithium ion batteries: advantages and limitations", Electrochimca Acta, vol. 48, 2003, pp. 1579-1587.
"Determination of the specific surface area of solids by gas adsorption using the BET method", German Standard, May 2003, 39 pages (whole document).
Jun Yang, et al., "Sub-Microcrystalline Sn and Sn-SnSb Powders as Lithium Storage Materials for Lithium-Ion Batteries", Electrochemical and Solid-State Letters, vol. 2, No. 4, 1999, pp. 161-163.
Bo Gao, et al., "Alloy Formation in Nanostructured Silicon", Advanced Materials, vol. 13, No. 11, Jun. 5, 2001, pp. 816-819.
J. Graetz, et al., "Highly Reversible Lithium Storage in Nanostructured Silicon", Electrochemical and Solid-State Letters, vol. 6, No. 9, 2003, pp. A194-A197.
Robert A. Huggins, "Alternative materials for negative electrodes in lithium systems", Solid State Ionics, vols. 152-153, 2002, pp. 61-68.
San-Cheng Lai, "Solid Lithium-Silicon Electrode", The Electrochemical Society, pp. 1196-1197, 1976.
D. Larcher, et al., "Si-containing disordered carbons prepared by pyrolysis of pitch/polysilane blends: effect of oxygen and sulfur", Solid State Ionics, vol. 122, 1999, pp. 71-83.
Hong Li, et al., "A High Capacity Nano-Si Composite Anode Material for Lithium Rechargeable Batteries", Electrochemical and Solid-State Letters, vol. 2, No. 11, 1999, pp. 547-549.
M. J. Lindsay, et al., "Al-based anode materials for Li-ion batteries", Journal of Power Sources, vols. 119-121, 2003, pp. 84-87.
Jianjun Niu, et al., "Improvement of Usable Capacity and Cyclability of Silicon-Based Anode Materials for Lithium Batteries by Sol-Gel Graphite Matrix", Electrochemical and Solid-State Letters, vol. 5, No. 6, 2002, pp. A107-A110.
Randall N. Seefurth, et al., "Investigation of Lithium Utilization from a Lithium-Silicon Electrode", J. Electrochem. Soc., vol. 1.24, Aug. 1977, pp. 1207-1214.
A. M. Wilson, et al., "Lithium Insertion in Carbons Containing Nanodispersed Silicon", J. Electrochem. Soc., vol. 142, No. 2, Feb. 1995, pp. 326-332.
Z. S. Wen, et al., "High capacity silicon/carbon composite anode materials for lithium ion batteries", Electrochemistry Communications, vol. 5, 2003, pp. 165-168.
W. J. Weydanz, et al., "A room temperature study of the binary lithium-silicon and the ternary lithium-chromium-silicon system for use in rechargeable lithium batteries", Journal of Power Sources, vols. 81-82, 1999, pp. 237-242.
J. Yang, et al., "Small particle size multiphase Li-alloy anodes for lithium-ion-batteries", Solid State Ionics, vol. 90, 1996, pp. 281-287.
Corina Lupu, et al., "X-ray and Neutron Diffraction Studies on "$Li_{4.4}Sn$"", Inorganic Chemistry, vol. 42, No. 12, 2003, pp. 3765-3771.
Keith D. Kepler, et al., "$Li_xCu_6Sn_5$ (0<x<13): An Intermetallic Insertion Electrode for Rechargeable Lithium Batteries", Electrochemical and Solid-State Letters, vol. 2, No. 7, 1999, pp. 307-309.
Martin Winter, et al., "Insertion Electrode Materials for Rechargeable Lithium Batteries", Advanced Materials, vol. 10, No. 10, 1998, pp. 725-763.
Martin Winter, et al., "Electrochemical lithiation of tin and tin-based intermetallics and composites", Electrochimica Acta, vol. 45, 1999, pp. 31-50.
J. Yang, et al., "Si/C Composites for High Capacity Lithium Storage Materials", Electrochemical and Solid-State Letters, vol. 6, No. 8, 2003, pp. A154-A156.

* cited by examiner

NANOSCALAR SILICON PARTICLES IN NEGATIVE ELECTRODE MATERIALS FOR USE IN LITHIUM-ION BATTERIES

The invention relates to an electrode material and the use thereof in lithium ion batteries.

Lithium ion batteries are technically very interesting energy storage systems since they have the highest energy density of up to 180 Wh/kg among the known chemical and electrochemical energy stores which can be used in practice. The lithium ion batteries are used in particular in the area of portable electronics, such as, for example, laptops or mobile telephones. The use of lithium ion batteries in the area of means of transport, such as, for example, bicycles or automobiles, has also already been discussed.

In particular graphitic carbon is used as negative electrode material ("anode"). The graphitic carbon is distinguished by its stable cycle properties and its very high safety with regard to handling in comparison with lithium metal, which is used in so-called "lithium batteries". A substantial argument for the use of graphitic carbon in negative electrode materials is the small volume changes of the host material which are associated with the incorporation and elimination of lithium, i.e. the electrode remains approximately stable. Thus, a volume increase of only about 10 for the limiting stoichiometry of $LiC_6$ can be measured for lithium incorporation in graphitic carbon. However, the very low potential of about 100-200 mV relative to $Li/Li^+$ of graphitic carbon is disadvantageous. On the other hand, a further disadvantage of graphitic carbon is its relatively low electrochemical capacitance of, theoretically, 372 mAh/g of graphite, which corresponds approximately to only one tenth of the electrochemical capacitance of 4235 mAh/g of lithium which can be theoretically achieved with lithium metal.

The search for alternative materials has therefore been ongoing for a long time, especially in the area of alloys, such as, for example, binary alloys based on aluminum (Lindsay et al. in J. Power Sources 119 (2003), 84), tin (Winter et al. in Electrochim. Acta 45 (1999), 31; Tirado in Mater. Sci. Eng. R-Rep. 40 (2003), 103) or antimony (Tirado in Mater. Sci. Eng. R-Rep. 40 (2003), 103), ternary alloys based on copper-tin (Kepler et al. in Electrochem. Solid-State Lett. 2 (1999), 307) or copper-antimony (Yang et al. in Electrochem. Solid State Lett. 2 (1999), 161) or metal oxides based on tin oxide (Huggins in Solid State Ion. 152 (2002), 61). These materials have high theoretical specific capacitances of, for example, 994 mAh/g in the case of tin. If it were possible to utilize these high theoretical capacitances reversibly, a substantial increase in the energy density of lithium ion batteries would be possible.

In comparison with metallic lithium, anode materials based on alloys have the advantage that dendrite formation during lithium deposition does not occur. In contrast to graphite materials, anode materials based on alloys are suitable for use together with electrolytes based on propylene carbonate. This permits the use of lithium ion batteries at low temperatures. The disadvantage of these alloys is, however, the large volume expansion during the cycle—i.e. during the incorporation and elimination of lithium, which is more than 200% and in some cases even up to 300% (Besenhard et al. in J. Power Sources 68 (1997), 87).

With the use of metal oxides as electrode material, a reduction of the metal oxide to metal and lithium oxide takes place during the first lithium incorporation, the lithium oxide embedding the fine metal particles in the manner of a matrix. During the subsequent cycles, a volume expansion can therefore be partly absorbed, substantially improving the cycle behavior.

Silicon was likewise researched because, similarly to tin, it forms with lithium binary compounds which are electrochemically active (Weydanz et al. in Journal of Power Sources 82 (1999), 237; Seefurth et al. in J. Electrochem. Soc. 124 (1977), 1207; Lai in J. Electrochem. Soc. 123 (1976), 1196). These binary compounds of lithium and silicon have a very high lithium content. The theoretical maximum of lithium content is $Li_{4.2}Si$, corresponding to a very high theoretical specific capacitance of about 4400 mAh/g of silicon (Lupu et al. in Inorg. Chem. 42 (2003), 3765). These binary compounds form at a low potential similar to that in the case of the intercalation compounds of lithium in graphite at <500 mV relative to $Li/Li^+$ (i.e. relative to the potential of metallic lithium, which serves as a reference). As in the case of the abovementioned binary alloys, the incorporation and elimination of lithium is associated with a very great volume expansion of not more than 323% in the case of silicon too. This volume expansion leads to considerable mechanical loading of the crystallites and hence to amorphization and breaking apart of the particles with loss of electrical contact (Winter et al. in Adv. Mater. 10 (1998), 725; Yang et al. in Solid State Ion. 90 (1996), 281; Bourderau et al. in J. Power Sources 82 (1999), 233).

Various techniques are used for improving the adhesion of the silicon to the carrier material such as, for example, thorough milling for several hours (Dimov et al. in Electrochim. Acta 48 (2003), 1579; Niu et al. in Electrochem. Solid State Lett. 5 (2002), A107), Carbon coating from the gas phase (Wilson et al. in J. Electrochem. Soc. 142 (1995), 326) and pyrolysis of an intimate mixture of the respective precursors (Larcher et al. in Solid State Ion. 122 (1999), 71; Wen et al. in Electrochem. Commun 5 (2003), 165). Experiments have been performed both with silicon-rich (60-80% by weight of Si) and low-silicon (5-20% by weight of Si) formulations.

Experiments with nanoscale materials, i.e. having a particle size of about 100 nm, are described by Graetz et al. in Electrochem. Solid State Lett. 6 (2003), A194; Li et al. in Electrochem. Solid State Lett. 2 (1999), 547, Yang et al. in Electrochem. Solid State Lett. 6 (2003), A154 and Gao et al in Adv. Mater. 13 (2001), 816. Graetz et al. describe the preparation of nanoscale silicon films which have a reversible capacitance of more than 2300 mAh/g (in the case of a film deposited by means of chemical vapor deposition) or 1100 mAh/g (in the case of the film building up on particles), but the fading is relatively high. Li et al. use a mixture of nanoscale silicon and carbon black, which likewise has a very high capacitance of initially up to more than 2000 mAh/g, which, however, substantially decreases over the cycle, and less than 25 cycles are described. Yang et al. use the pyrolysis of a nanosilicon-containing starting mixture for the preparation of their active materials and obtain reversible capacitances of more than 700 mAh/g during 30 cycles, but here too the fading could not be avoided. Gao et al. describe the electrochemical reaction of silicon obtained by laser ablation with lithium, but obtain a reversible capacitance of initially about 700 mAh/g.

It was an object of the present invention to provide an electrode material which has a high reversible capacitance, it preferably intended at the same time to achieve slight fading and/or smaller irreversible capacitance losses in the first cycle. In particular, it was the object to provide an electrode material which has sufficient mechanical stability during the cycle.

In the context of this invention, fading is understood as meaning the decline of the reversible capacitance during the continued cycle.

Surprisingly, it was found that an electrode material which comprises nanoscale silicon particles which have a BET surface area of 5 to 700 m$^2$/g and a mean particle diameter of from 5 to 200 nm leads to good cycle behavior, in particular in comparison with silicon-based negative electrodes for lithium ion batteries according to the prior art. The achievement of the object was all the more surprising since it was found that these electrodes have a very high reversible capacitance which also remains approximately constant in the course of the cycle so that only slight fading is observable. Furthermore, it was found that, as a result of the use of these nanoscale silicon particles, the electrode material has substantially improved mechanical stability. Also surprising was the fact that the irreversible capacitance loss during the first cycle could be reduced.

The invention therefore relates to an electrode material for lithium ion batteries, which is distinguished by the fact that the electrode material comprises 5-85% by weight of nanoscale silicon particles which have a BET surface area of from 5 to 700 m$^2$/g and a mean primary particle diameter of from 5 to 200 nm,
0-10% by weight of conductive carbon black,
5-80% by weight of graphite having a mean particle diameter of from 1 μm to 100 μm and
5-25% by weight of a binder, the proportions of the components summing to not more than 100% by weight.

The invention furthermore relates to the use of the electrode material according to the invention for the production of lithium ion batteries. The invention furthermore relates to a lithium ion battery having a negative electrode which comprises the electrode material according to the invention.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

Figure 1:
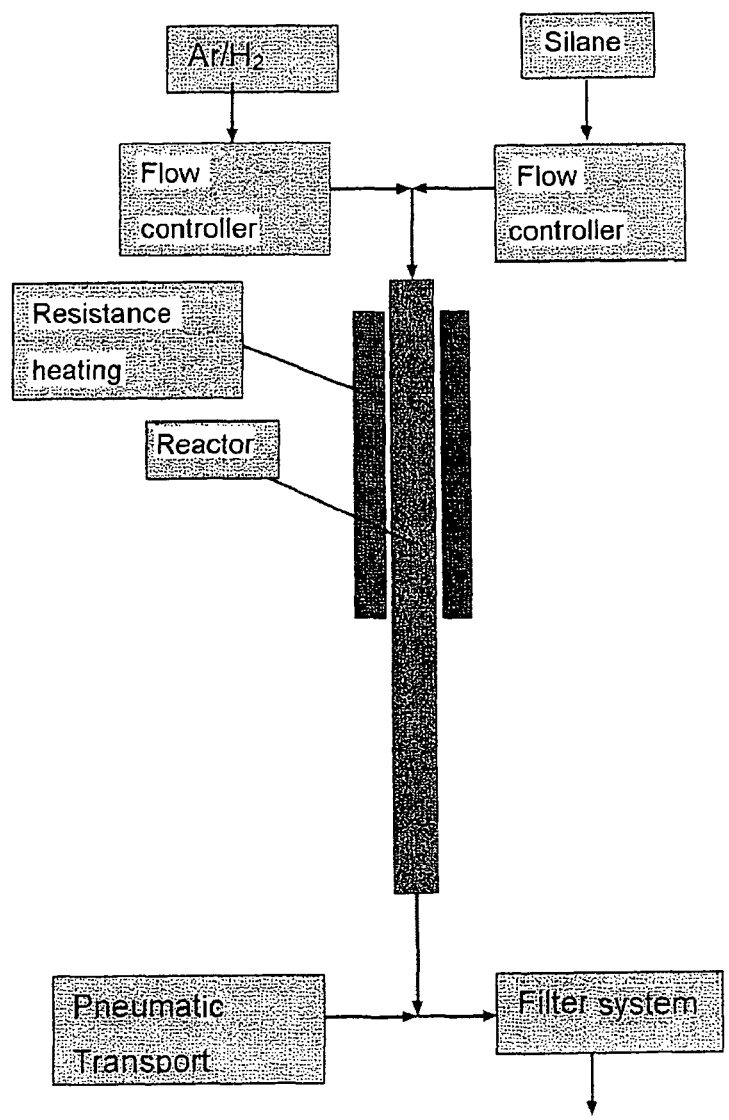
FIG. 1 shows the schematic setup of the experimental arrangement. In a downstream filter unit, the pulverulent product is separated from the gaseous substances.

Electrodes in which the electrode material according to the invention is used have a very high reversible capacitance; this applies both to the electrode material according to the invention which has a high content of nanoscale silicon particles and to the electrode material according to the invention which has a lower content of nanoscale silicon particles. This reversible capacitance also remains approximately constant in the course of the cycle so that only slight fading is observable. Furthermore, the electrode material according to the invention has good stability. This means that scarcely any fatigue phenomena, such as, for example, mechanical destruction, of the electrode material according to the invention occur even during relatively long cycles. The irreversible capacitance loss during the first cycle can be reduced with the use of the electrode material according to the invention in comparison with corresponding silicon-containing and alloy-based electrode materials for lithium ion batteries according to the prior art. In general, the electrode material according to the invention has good cycle behavior. Furthermore, the electrode material according to the invention has the advantage that there is sufficient stability to an electrolyte based on propylene carbonate.

The electrode material, according to the invention, for lithium ion batteries is distinguished by the fact that the electrode material comprises 5-85% by weight of nanoscale silicon particles which have a BET surface area of from 5 to 700 m$^2$/g and a mean primary particle diameter of from 5 to 200 nm,
0-10% by weight of conductive carbon black,
5-80% by weight of graphite having a mean particle diameter of from 1 μm to 100 μm and
5-25% by weight of a binder, the proportion of the components summing to not more than 100% by weight.

In the context of this invention, electrode material is understood as meaning a substance or a mixture comprising two or more substances, which substance or which mixture makes it possible to store electrochemical energy in a battery through oxidation and/or reduction reactions. Depending on whether the electrochemical reaction which, in the (charged) battery, delivers energy is an oxidation or reduction, the term negative or positive electrode material or the term anode or cathode material is used.

It may be advantageous if the electrode material according to the invention contains from 0 to 5% by weight, preferably from 0.5 to 4% by weight, of conductive carbon black. Preferably, the electrode material according to the invention contains, as the conductive carbon black, a high-purity synthetic carbon black; this preferably has a mean particle size of from 20 to 60 nm, particularly preferably from 30 to 50 nm. It is furthermore advantageous if the conductive carbon black contained in the electrode material according to the invention has a BET surface area of from 50 to 80 m$^2$/g, preferably from 55 to 70 m$^2$/g. In a particular embodiment of the electrode material according to the invention, the latter comprises, as conductive carbon black, a high-purity synthetic carbon black having a mean particle size of from 35 to 45 nm and a BET surface area of from 57 to 67 m$^2$/g.

It may also be advantageous if the electrode material according to the invention comprises from 5 to 25% by weight, preferably from 5 to 10% by weight and particularly preferably 10% by weight of a binder. In the context of this invention, a binder is understood as meaning a chemical compound which is capable of binding the components silicon particles, graphite and, if desired, conductive carbon black with one another and with the carrier material, which preferably comprises copper, nickel or stainless steel. The electrode material according to the invention preferably comprises polymeric binders, preferably polyvinylidene fluoride (PVdF), polytetrafluoroethylene or polyolefins, but particularly preferably thermo-plastic elastomers, in particular ethylene/propylene-diene terpolymers. In a particular embodiment of the electrode material according to the invention, the latter comprises gelatin or modified cellulose as the binder.

The electrode material according to the invention comprises from 5 to 80% by weight of graphite, which preferably has a mean particle diameter of from 1 to 100 μm, preferably from 2 to 50 μm. The graphite contained in the electrode material according to the invention preferably has a $d_{90}$ value of from 5 to 10 μm. In the context of this invention, a $d_{90}$ value of 6 µm is understood as meaning that 90% of all particles have a particle size of less than or equal to 6 µm. Furthermore, the graphite contained in the electrode material according to the invention has a BET surface area of, preferably, from 5 to 30 m²/g, preferably from 10 to 20 m²/g.

The electrode material according to the invention furthermore comprises from 5 to 85% by weight of nanoscale silicon particles which have a mean primary particle diameter of from 5 to 200 nm, preferably from to 100 nm. Primary particles which have agglomerated to form agglomerates or aggregates preferably have a size of from 20 to 1000 nm. The particle diameters are determined on the basis of micrographs obtained by means of a transmission electron microscope (TEM).

In a preferred embodiment, the electrode material according to the invention preferably comprises from 8 to 20% by weight, preferably from 10 to 15% by weight, of graphite and from 65 to 86.5% by weight, but preferably from 70 to 84.5% by weight, of nanoscale silicon particles. In a particularly preferred embodiment of the electrode material according to the invention for lithium ion batteries, said electrode material comprises 65-86.5% by weight of nanoscale silicon particles,
0.5-10% by weight of conductive carbon black,
8-20% by weight of graphite having a mean particle diameter of from 1 µm to 100 µm and
5-10% by weight of a binder.

The following composition of the electrode material according to the invention is very particularly preferred 80% by weight of nanoscale silicon particles,
0.5-10% by weight of conductive carbon black,
10-15% by weight of graphite having a mean particle diameter of from 1 µm to 100 µm and
5-10% by weight of a binder.

In a further embodiment of the electrode material according to the invention, the latter comprises from 55 to 85% by weight, preferably from 65 to 80% by weight, of graphite and from 5 to 40% by weight, preferably from 10 to 30% by weight, of nanoscale silicon particles. In a preferred embodiment, this electrode material according to the invention comprises 5-40% by weight of nanoscale silicon particles,
55-85% by weight of graphite having a mean particle diameter of from 2 µm to 50 µm and
5-10% by weight of a binder.

The following composition of the electrode material according to the invention is particularly preferred 20% by weight of nanoscale silicon particles,
70-75% by weight of graphite having a mean particle diameter of from 2 µm to 50 µm and
5-10% by weight of a binder.

The electrode material according to the invention comprises, as silicon particles, a nanoscale, aggregate, crystalline silicon powder having a BET surface area of, preferably, from 5 to 700 m²/g, preferably from 6 to 140 m²/g, particularly preferably from 7 to 50 m²/g and very particularly preferably from 10 to 20 m²/g. In a particular embodiment of the electrode material according to the invention, said material may comprise a nanoscale, aggregate, crystalline silicon powder having a BET surface area of at least 150 m²/g, preferably of from 160 to 600 m²/g, particularly preferably from 160 to 450 m²/g. According to this invention, the BET surface area is determined according to ISO 9277 (1995), which supersedes DIN 66131.

In the context of this invention, aggregate is to be understood as meaning that spherical or very substantially spherical primary particles, as are initially formed in the reaction, coalesce in the further course of the reaction to form aggregates. The degree of intergrowth of the aggregates can be influenced by the process parameters. These aggregates can form agglomerates in the further course of the reaction. In contrast to the aggregates, which as a rule can be divided into the primary particles only partially, if at all, agglomerates are understood in the context of this invention as meaning only a loose association of aggregates which can readily disintegrate into the aggregates.

Crystalline is to be understood as meaning that at least 90% of the freshly prepared silicon powder is crystalline. In the context of this invention, freshly prepared powder is understood as meaning the powder which has just passed through the production process and as yet exhibits no aging phenomena, such as, for example, due to oxidation at the surface. Such a crystallinity can be determined, for example, by X-ray diffractometry by means of a comparison of the intensities of the [111], [220] and [311] signals of the silicon powder used with a silicon powder of known crystallinity and crystallite size. A silicon powder having a crystallinity of at least 95% is preferred, particularly preferably a crystallinity of at least 98%. For example, the evaluation of micrographs of a transmission electron microscope (TEM) and counting of the primary particles which have lattice lines as a feature of the crystalline state are suitable for determining this crystallinity.

Furthermore, the electrode material according to the invention may comprise silicon particles which are doped. The elements phosphorus, arsenic, antimony, boron, aluminum, gallium and/or indium may be present as doping components. In the context of the invention, doping component is to be understood as meaning the element present in the silicon particles. The proportion of these doping components in the silicon particles may be up to 1% by weight. As a rule, the silicon particles contain the doping component in the ppm or ppb range. A range from $10^{13}$ to $10^{15}$ atoms of doping component/cm³ is preferred.

It is also possible for the silicon particles in the electrode material according to the invention to comprise lithium as the doping component. The proportion of lithium in the silicon particles may be up to 53% by weight. Particularly preferably, up to 20 to 40% by weight of lithium may be contained in the silicon particles.

The doping component may be homogeneously distributed in the silicon particles or may have accumulated or be intercalated in the coat or in the core of the primary particles. Preferably, the doping components can be incorporated as lattice sites of the silicon. This is substantially dependent on the type of dopant and on the reaction in the production of the silicon particles.

The electrode material according to the invention may comprise silicon particles which, as long as they are freshly produced, still have a hydrogen loading of up to 98 mol %, based on silicon at the particle surface, a range of from 30 to 95 mol % being particularly preferred. NMR spectroscopic methods, such as, for example, ¹H-MAS-NMR spectroscopy, headspace gas chromatography after hydrolytic hydrogen elimination or effusion spectrometry after thermal hydrogen elimination are suitable for determining the hydrogen loading. For a qualitative determination of the hydrogen loading, IR spectroscopy may also be used.

The production of the silicon particles contained in the electrode material according to the invention is preferably effected by means of a process which is characterized in that
at least one silane in vapor or gaseous form and, if desired,
at least one dopant in vapor or gaseous form, an inert gas and hydrogen are thermally treated in a hot-wall reactor, the reaction mixture is cooled or was allowed to cool and the reaction product is separated in the form of a powder from gaseous substances, the proportion of the silane being from 0.1 to 90% by weight, based on the sum of silane, dopant, hydrogen and inert gases, and the proportion of hydrogen, based on the sum of hydrogen, silane, inert gas and, if desired, dopant, being in the range from 1 mol % to 96 mol %. A wall-heated hot-wall reactor can particularly advantageously be used, it being necessary to dimension the hot-wall reactor so that the most complete conversion of the starting material and, if desired, of the dopant is achieved. As a rule, the residence time in the hot-wall reactor is from 0.1 s to 2 s. The maximum temperature in the hot-wall reactor is preferably chosen so that it does not exceed 1000° C. The cooling of the reaction mixture can be effected, for example, by external wall cooling of the reactor or by introduction of inert gas in a quench. Preferably, hydrogen-containing compounds of phosphorus, arsenic, antimony, boron, aluminum, gallium, indium and/or lithium can be used as the dopant. Diborane and phosphane or substituted phosphanes, such as $tBuPH_2$, $tBu_3P$, $tBuPh_2P$ and trismethylaminophosphane $((CH_3)_2N)_3P$, are particularly preferred. In the case of lithium as the doping component, it has proven to be most advantageous to use the metal lithium or lithium amide $LiNH_2$ as the dopant. Aggregated, crystalline silicon powder having a BET surface area of from 5 to 150 m²/g can be produced by means of this production process.

Dopant is to be understood as meaning the compound which is used in the process in order to obtain the doping component.

The electrode material according to the invention may also comprise, as silicon particles, a nanoscale, aggregated, silicon powder which was produced by a process which is characterized in that at least one silane in vapor or gaseous form and, if desired, at least one dopant in vapor or gaseous form, together with an inert gas, is continuously transferred to a reactor and mixed there, the proportion of the silane being from 0.1 to 90% by weight, based on the sum of silane, dopant and inert gases, a plasma is produced by energy input by means of electromagnetic radiation in the microwave range at a pressure of from 10 to 1100 mbar and the reaction mixture is allowed to cool or is cooled and the reaction product is separated in the form of a powder from gaseous substances. This production process produces a stable plasma which leads to a very uniform product and, in contrast to processes which operate in a high vacuum, permits high conversions. As a rule, the conversion of silane is at least 98%. The process is carried out in such a way that the proportion of silane, if desired with inclusion of the doping component, in the gas stream is from 0.1 to 90% by weight. A proportion of silane of from 1 to 10% by weight is preferred. In the case of this proportion, as a rule aggregates having a diameter of less than 1 μm are obtained. The power input is not limited. It should preferably be chosen so that the unabsorbed microwave power reflected back is minimal and a stable plasma forms. As a rule, the energy input in this production process is from 100 W to 100 kW and particularly preferably from 500 W to 6 kW. The particle size distribution can be varied by means of the microwave powers input. Thus, in the case of the same gas compositions and volume flow rates, higher microwave powers thus lead to a smaller particle size and to a narrow particle size distribution. By means of this production process, aggregated, crystalline silicon powder having a BET surface area greater than 50 m²/g can be produced.

In both production processes for the silicon particles, the silane is preferably a silicon-containing compound which, under the reaction conditions, gives silicon, hydrogen, nitrogen and/or halogens. These are preferably $SiH_4$, $Si_2H_6$, $ClSiH_3$, $Cl_2SiH_2$, $Cl_3SiH$ and/or $SiCl_4$, $SiH_4$ being particularly preferred. It is also possible to use $N(SiH_3)_3$, $HN(SiH_3)_2$, $H_2N(SiH_3)$, $(H_3Si)_2NN(SiH_3)_2$, $(H_3Si)NHNH(SiH_3)$, $H_2NN(SiH_3)_2$.

In these two production processes, a dopant is a compound which contains the doping component in covalently or ionically bonded form and which, under the reaction conditions, gives the doping component, hydrogen, nitrogen, carbon monoxide, carbon dioxide and/or halogens. Hydrogen-containing compounds of phosphorus, arsenic, antimony, boron, aluminum, gallium, indium and/or lithium can preferably be used. Diborane and phosphane or substituted phosphanes, such as $tBuPH_2$, $tBu_3P$, $tBuPh_2P$ or $tBuPh_2P$ and trismethylaminophosphane $((CH_3)_2N)_3P$, are particularly preferred. In the case of lithium as doping component, it has proven most advantageous to use the metal lithium or lithium amide $LiNH_2$ as the dopant.

In both production processes for the silicon particles, mainly nitrogen, helium, neon or argon can be used as the inert gas, argon being particularly preferred.

The invention furthermore relates to the use of the electrode material according to the invention for the production of lithium ion batteries. The electrode material according to the invention is preferably used for the production of the negative electrode of a lithium ion battery. Here, the electrode material according to the invention can be applied in a layer thickness of from 2 μm to 500 μm, preferably from 10 μm to 300 μm, to a copper foil or another current collector by means of knife coating. Other coating methods can also be used. Before the coating of the copper foil with the electrode material according to the invention, a treatment of the copper foil with a commercial primer based on polymer resins is preferably effected. It increases the adhesion to the copper but itself has virtually no electrochemical activity. The primer is preferably a heavy metal-free polymer adhesive based on polychloroprene. It is preferably applied in a layer thickness of from 1 to 100 μm, preferably from 5 to 30 μm. However, it is also possible to use other adhesion promoters, or the use of the adhesion promoter can be completely dispensed with.

The electrode material according to the invention is preferably used for the production of lithium ion batteries which have, as electrolytes, an electrolyte composition comprising at least one organic solvent selected from ethylene carbonate, dimethyl carbonate, ethyl methyl carbonate, diethyl carbonate, propylene carbonate, butylene carbonate, methyl propyl carbonate, butyl methyl carbonate and its isomers, 1,2-dimethoxy-ethane, tetrahydrofuran, 2-methyltetrahydrofuran, diethylene glycol dialkyl ester, dioxolane, propylene oxide, dimethyl sulfoxide, dimethylformamide, formamide, nitromethane, gamma-butyrolactone, alkyl esters of carboxylic acids and/or methyl lactate, and at least one alkali metal salt or alkaline earth metal salt as a conductive salt, selected from $LiPF_6$, $LiClO_4$, $LiAsF_6$, $LiBF_4$, $LiCF_3SO_3$, $LiN(CF_3SO_2)_2$, $LiN(SO_2CF_2CF_3)_2$, $LiSbF_6$, $LiAlCl_4$, $LiGaCl_4$, $LiCl$, $LiNO_3$, $LiSCN$, $LiO_3SCF_2CF_3$, $LiC_6F_5SO_3$, $LiO_2CCF_3$, $LiFSO_3$, $LiB(C_6H_5)_4$, $LiB(C_2O_4)_2$, and lithium fluoroalkylphosphates. The concentration of the conductive salt is preferably from 0.5 mol/l to the solubility limit of the corresponding salt, but preferably 2 mol/l.

The lithium ion battery can, however, also have an electrolyte which comprises from 0.5 to 10% by weight, preferably from 2 to 5% by weight, of vinylene carbonate.

When the electrode material according to the invention is used according to the invention for the production of lithium ion batteries, an electrolyte which comprises from 20 to 70% by volume of ethylene carbonate and/or from 20 to 70% by volume of dimethyl carbonate, from 0.5 to 2 mol/l of $LiPF_6$ and an addition of from 0.5 to 5% by weight of vinylene carbonate is preferably used. An electrolyte which comprises propylene carbonate with from 0.5 to 2 mol/l of $LiPF_6$ and an addition of from 0.5 to 5% by weight of vinylene carbonate is particularly preferably used.

The invention furthermore relates to a lithium ion battery having a negative electrode which comprises the electrode material according to the invention.

The following examples are intended to illustrate the electrode material according to the invention in more detail without there being any intention to limit the invention to this embodiment.

1. Production of the Nanoscale Silicon Particles 1.1. Production of the Nanoscale Silicon Particles in a Hot-Wall Reactor The nanoscale silicon particles Si1, Si2 and Si3 were produced in a vertically arranged hot-wall reactor which has a length of 200 cm and a diameter d. The tube comprises quartz glass or Si/SiC with a quartz glass inliner initiated externally by means of a resistance heating over a zone of 100 cm to 1000° C. A starting material mixture comprising silane ($SiH_4$), argon and hydrogen is fed to this hot-wall reactor from above via a binary nozzle. The schematic setup of the experimental arrangement is shown in FIG. 1. In a downstream filter unit, the pulverulent product is separated from the gaseous substances. Table 1 contains the respective process parameters for the production of the nanoscale silicon particles Si1, Si2 and Si3.

|  | Diameter d of the tube (in cm) | Volume flow rate (in sccm[1]) | | |
|---|---|---|---|---|
|  |  | Silane ($SiH_4$) | Argon | Hydrogen |
| Si1 | 6 | 2300 | 8700 | 0 |
| Si2 | 6 | 3500 | 0 | 10500 |
| Si3 | 10 | 7000 | 0 | 21000 |

[1]sccm is standard centimeter cube per minute, 1 sccm corresponds to 1 $cm^3$ of gas per minute, based on 0° C. and atmospheric pressure.

1.2 Production of Nanoscale Silicon Particles which are Doped with Boron in a Microwave Reactor.

A microwave generator from Muegge is used for producing the plasma. The microwave radiation is focused by means of a tuner (3-rod tuner) in the reaction space. As a result of the design of the waveguide, the fine adjustment by means of the tuner and the exact positioning of the nozzle, which acts as an electrode, stable plasma is produced in the pressure range from 10 mbar to 1100 mbar and at a microwave power of from 100 to 6000 W. The microwave reactor comprises a quartz glass tube having an external diameter of 30 mm and a length of 120 mm, which is inserted into the plasma applicator. The nanoscale silicon particles of type SiB4 were produced by means of such a microwave reactor. For this purpose, an $SiH_4$/argon mixture—comprising 200 sccm of silane and 1800 sccm of argon—was fed to the microwave reactor via a binary nozzle, and a further mixture comprising 10 000 sccm of hydrogen and 20 sccm of $B_2H_6$ was fed to said reactor via the second nozzle. A power of 1000 W is introduced into the gas mixture by means of a microwave and a plasma is thus produced. The plasma torch emerging from the reactor via a nozzle expands into a space whose volume is relatively large at about 20 l in comparison with the reactor. The pressure in this space and in the reactor is regulated at 80 mbar. In a downstream filter unit the pulverulent product is separated from gaseous substances.

2. Characterization of the Nanoscale Silicon Particles

Figure 2A:
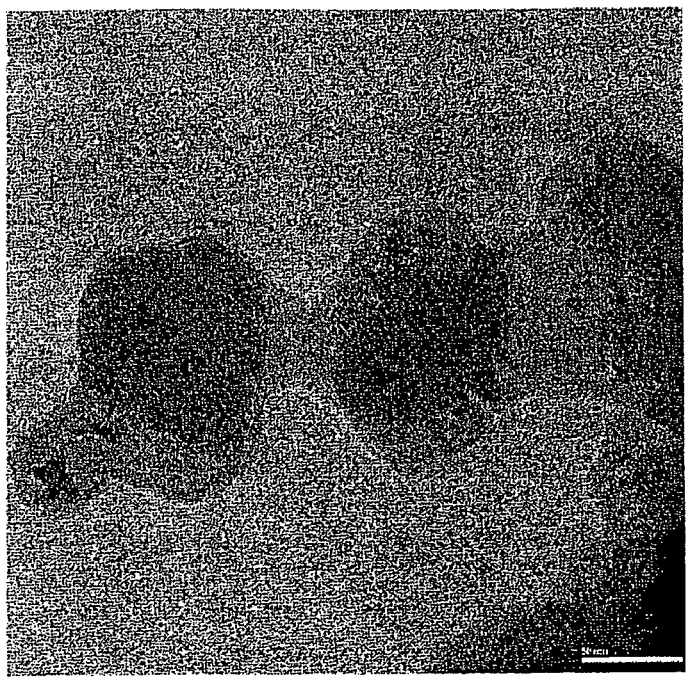
FIGS. 2a and 2b show transmission electron micrographs at different resolutions (bar corresponds to 50 nm in FIGS. 2a and 0.5 μm in FIG. 2b) of the nanoscale silicon particles Si3.
Figure 2B:
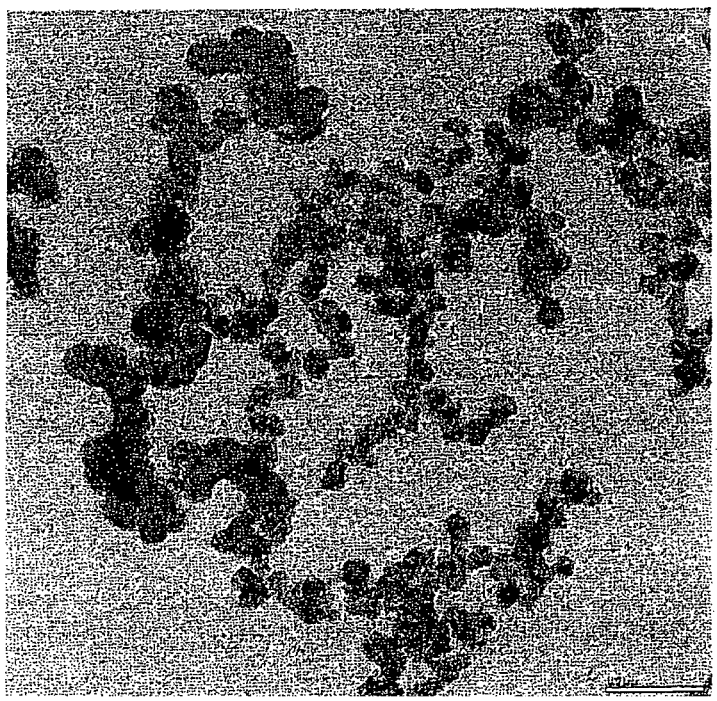

The BET surface areas of the nanoscale silicon particles were determined according to ISO 9277 (1995). The particle sizes were determined on the basis of transmission electron micrographs. FIGS. 2a and 2b show transmission electron micrographs at different resolutions (bar corresponds to 50 nm in FIG. 2a and 0.5 μm in FIG. 2b) of the nanoscale silicon particles Si3. Table 1 shows a list of the nanoscale silicon particles used in the examples.

TABLE 1

|  | Si1 | Si2 | Si3 | SiB4 |
|---|---|---|---|---|
| Primary particle size (nm) | 20-200 | 20-200 | 20-200 | 5-50 |
| Shape of the particles | Thread-like | Thread-like | Thread-like | Spherical |
| Specific surface area ($m^2/g$) | 11 | 12 | 11 | 170 |

3. Production of the Electrode Material

The materials are first mechanically mixed, then mixed again in an N-methylpyrrolidone suspension by means of a high-speed stirrer and then applied by means of a knife coater, in a thickness of, preferably, 250 μm, to a 20 μm thick commercial copper foil pretreated with a primer. The copper foil coated in this manner is then dried at 80° C. in vacuo. In some cases, the material was then rolled at about 80° C. The electrodes were then punched as a circular shape out of this coated copper foil.

The treatment of the copper foil before the coating with the electrode material according to the invention was effected using a commercial primer based on polymer resins. Said primer increases the adhesion to the copper but itself has virtually no electrochemical activity. The primer used in our case was the "Conti Plus adhesion promoter", from ContiTech. It is a heavy metal-free polymer adhesive based on polychloroprene. It is applied in a layer thickness of from 5 to 30 μm.

Table 2 shows a list of the electrode materials according to the invention which are used in the examples, and the composition thereof.

TABLE 2

| Example | Nanoscale silicon particles (% by weight) | Conductive carbon black (% by weight) | Finely divided graphite (% by weight) | Binder (% by weight) |
|---|---|---|---|---|
| EM_Si1_80 | 80 Si1 | <2 | 10 | 8 PVdF |
| EM_Si2_80 | 80 Si2 | <2 | 10 | 8 PVdF |
| EM_Si3_80 | 80 Si3 | <2 | 10 | 8 PVdF |
| EM_SiB4_80 | 80 SiB4 | <2 | 10 | 8 PVdF |
| EM_Si1_20 | 20 Si1 | 0 | 70 | 10 PVdF |
| EM_Si2_20 | 20 Si2 | 0 | 70 | 10 PVdF |
| EM_SiB4_60 | 60 SiB4 | 0 | 15 | 25 polyolefin (Oppanol B 200 from BASF) |

The conductive carbon black used was a conductive carbon black having the product name Super P (manufacturer TIMCAL SA, Switzerland); this is a high-purity synthetic carbon black having a mean particle size of about 40 nm and a BET surface area of 62 $m^2/g$ (±5 $m^2/g$).

The graphite used was a graphite having the product name KS6 (manufacturer TIMCAL SA, Switzerland); this is a synthetic graphite having a $d_{90}$ value of about 6 μm and a BET surface area of about 13.8 $m^2/g$. The particle shape of this graphite tends to be round. In example B9 (in table 5), however, a graphite having the product name SFG6 (manufacturer TIMCAL SA, Switzerland) was used. This is a synthetic graphite having a $d_{90}$ value of about 6 μm and a BET surface area of about 17.1 m²/g. The particle shape of this graphite tends to be flat. Compared with KS6, it has a higher stability to the propylene carbonate-based electrolyte used in example B9.

4. Carrying Out the Electrochemical Investigations

The electrochemical cycles took place in so-called half-cell and full-cell arrangements. For the half-cell arrangement, the electrode material according to the invention is measured as a working electrode in a sandwich arrangement, working electrode—separator/electrolyte—opposite/reference electrode, against a lithium disk as opposite electrode and reference electrode. 100 mV and 1.0 V relative to $Li/Li^+$ are used as potential limits. In the case of complete batteries, the material is measured in the full-cell arrangement, working electrode (graphite)—separator/electrolyte—opposite electrode ($LiCoO_2$), against the standard cathode material $LiCoO_2$. Potential limits used here are from 2.5 to 3 V and from 4 to 4.2 V. The cycle rate is stated as the current density per active mass—this corresponds to the total mass of silicon particles and graphite—of the electrode material. The values used for this purpose are from 74 to 372 mA/g.

The charging is effected with a current reduction on reaching the voltage limit to below a value which corresponds to 10 mA/g. The use of this current reduction makes it possible to separate the efficiency of an electrode (proportion of current which flows in the constant current mode, or galvanostatic fraction) from possible irreversible damage (which in a reduction of the total capacitance, i.e. including that flowing in the potentiostatic step) (cf. in this context H. Buqa et al. in *ITE Battery Letters*, 4 (2003), 38).

Two different types of experimental procedure were carried out:
1. the classical one with a cut-out mode for the individual half-cycles which is based exclusively on the upper and lower potential limits. This is the mode used in the case of all conventional batteries.
2. the so-called capacitance-limiting mode in which, in addition to the lower potential limit in the charging step, a maximum capacitance is specified. This prevents excessive charging and thus reduces the mechanical stress on the silicon, which should increase the life of the electrode.

5. Composition of the Electrolyte

The composition of the electrolytes used is shown in table 3.

TABLE 3

| EL1 | Ethylene carbonate: dimethyl carbonate (in the ratio 1:1) | 1 mol/l $LiPF_6$ | 2% by weight of vinylene carbonate |
| EL2 | Ethylene carbonate: dimethyl carbonate (in the ratio 1:1) | 1 mol/l $LiPF_6$ | |
| EL3 | Propylene carbonate | 1 mol/l $LiPF_6$ | 2% by weight of vinylene carbonate |

6. Results of Electrochemical Investigations by Means of a Half-Cell Arrangement Table 4 shows the experimental parameters with an experimental procedure according to the classical mode, and table 5 shows the experimental parameters with an experimental procedure according to the capacitance-limited mode.

TABLE 4

Figure 3:
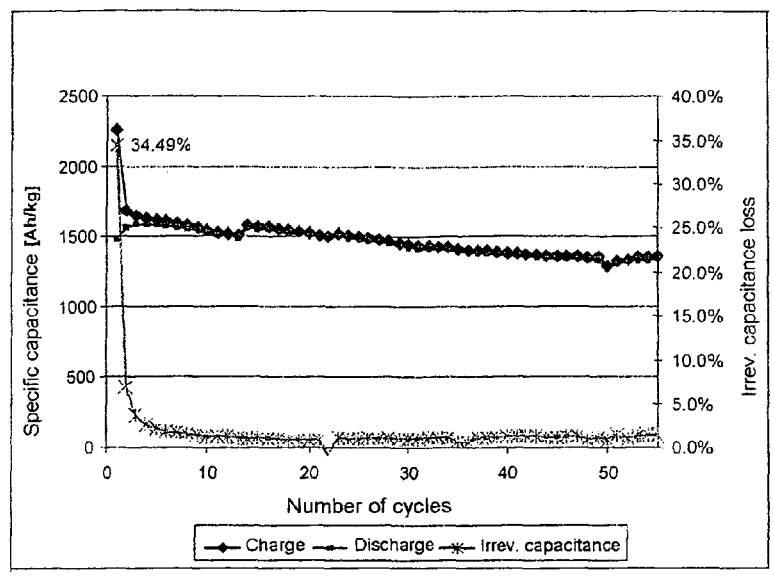
FIGS. 3 to 15 are referenced in Tables 4 and 5, respectively. Table 4 shows the experimental parameters with an experimental procedure according to the classical mode, and table 5 shows the experimental parameters with an experimental procedure according to the capacitance-limited mode.
Figure 4:
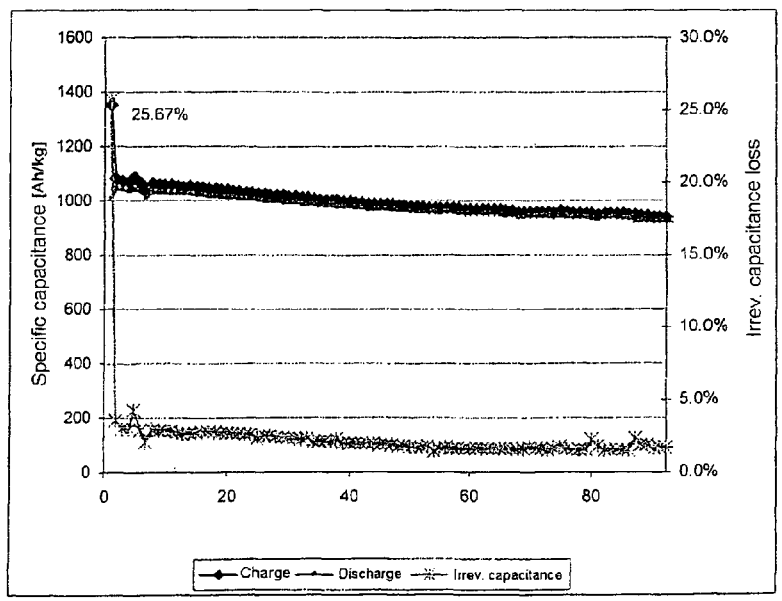

| Example | Electrode material | Electrolyte | Classical cycles with z mA/g z | Also see |
|---|---|---|---|---|
| B1 | EM_Si1_80 | EL1 | 74 | FIG. 3 |
| B2 | EM_Si1_20 | EL1 | 50 | FIG. 4 |

TABLE 5

Figure 5:
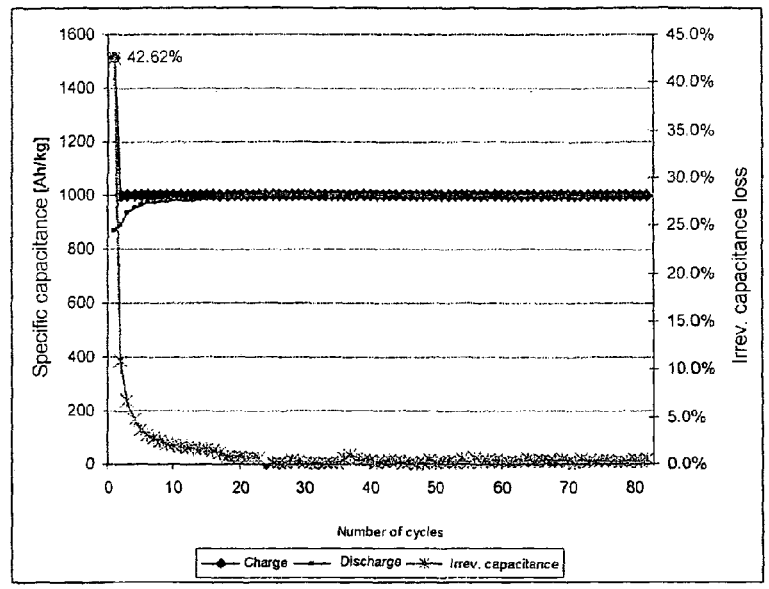
Figure 6:
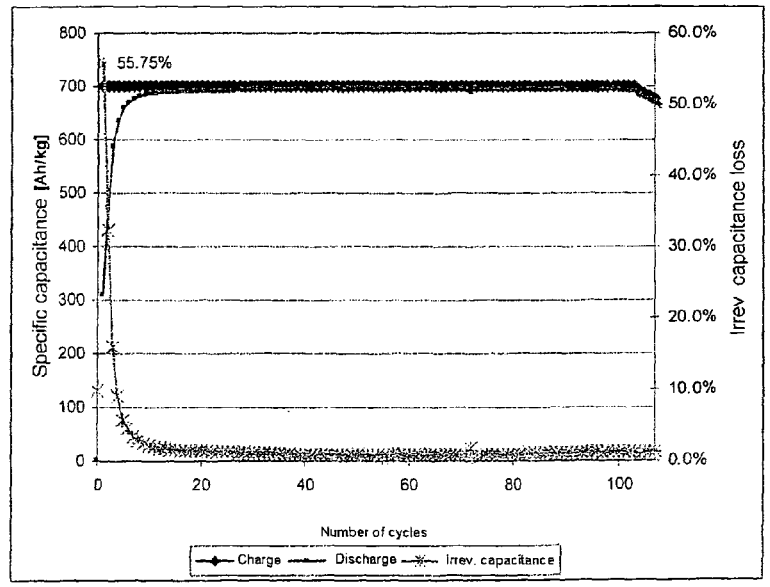
Figure 7:
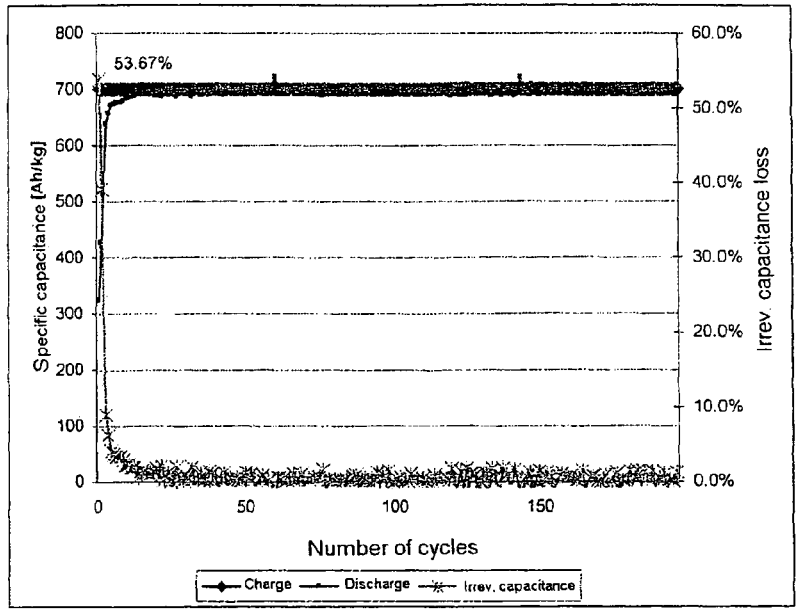
Figure 8:
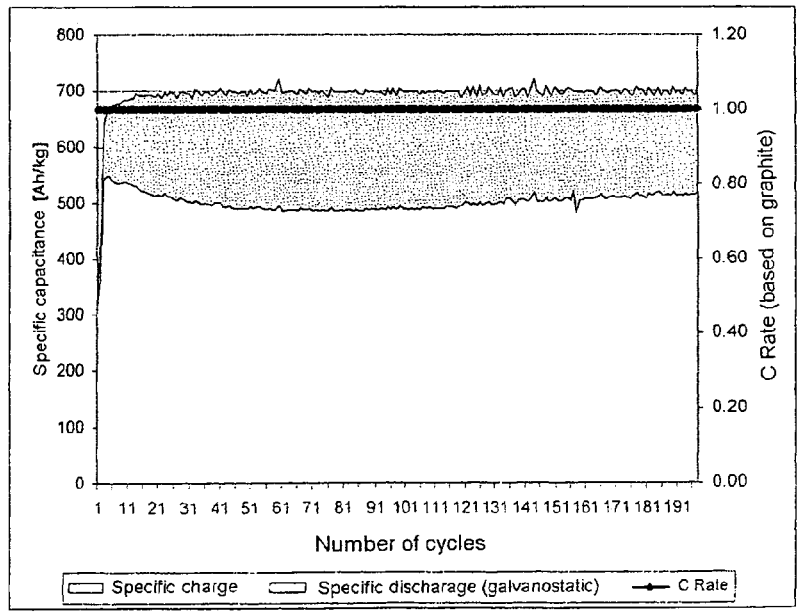
Figure 9:
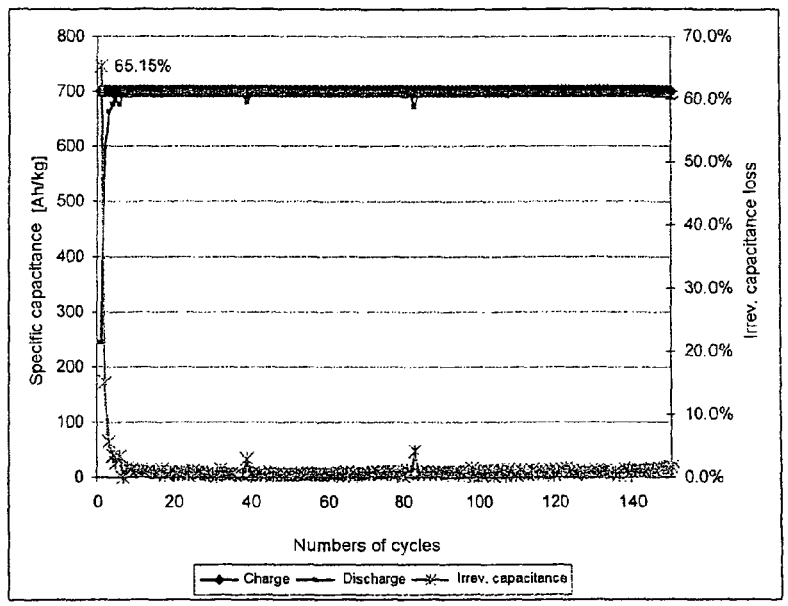
Figure 10:
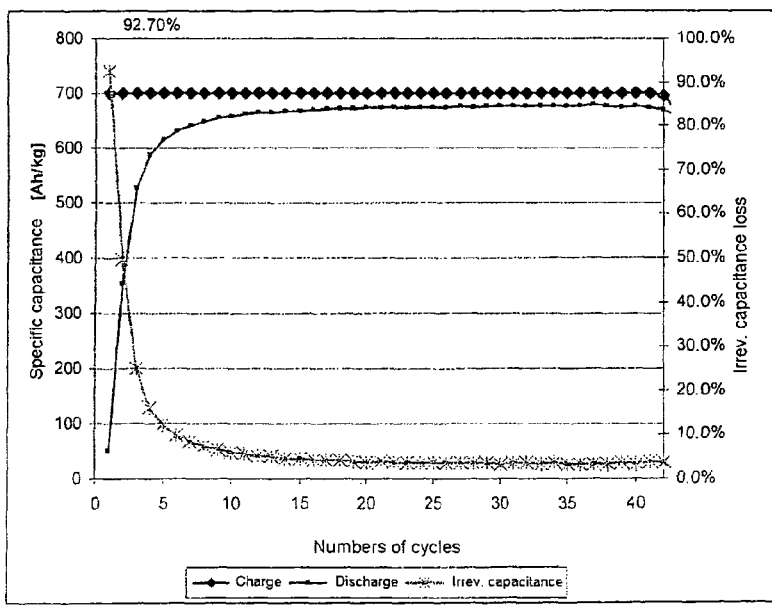
Figure 11:
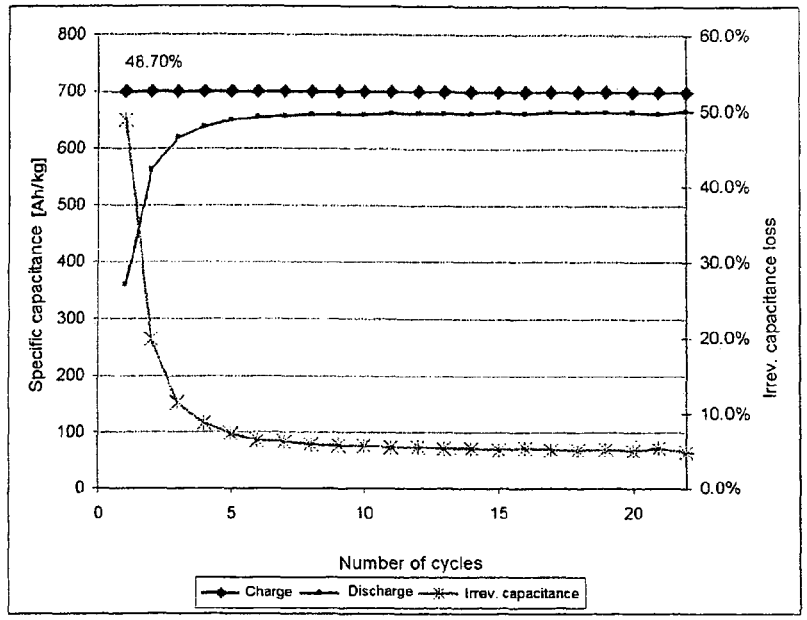
Figure 12:
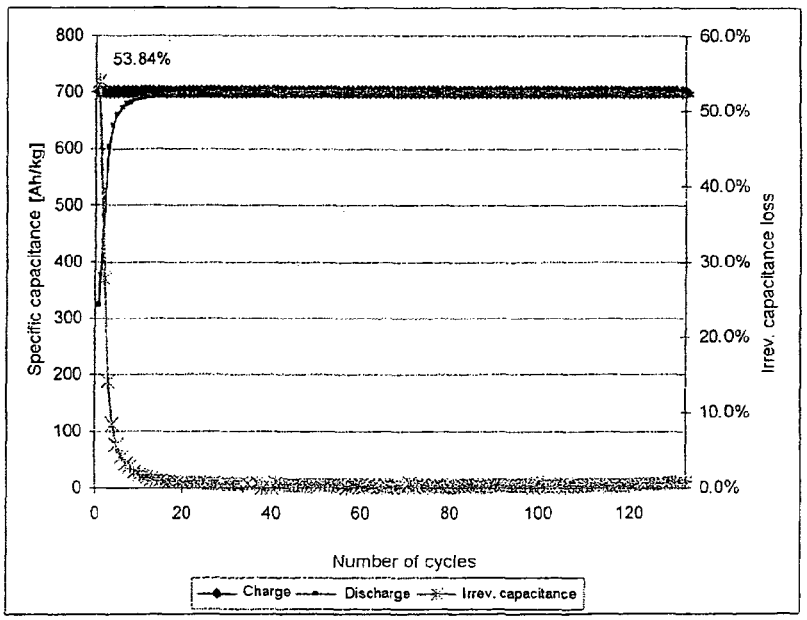
Figure 13:
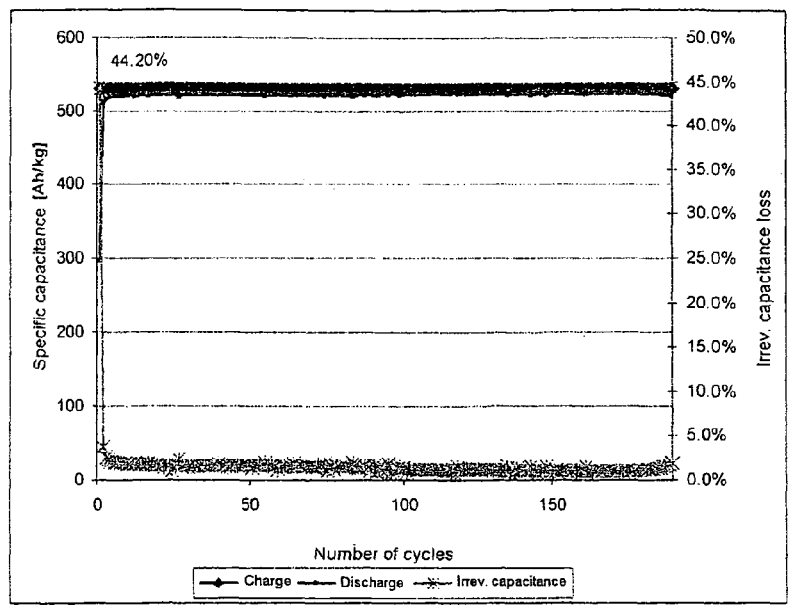
Figure 14:
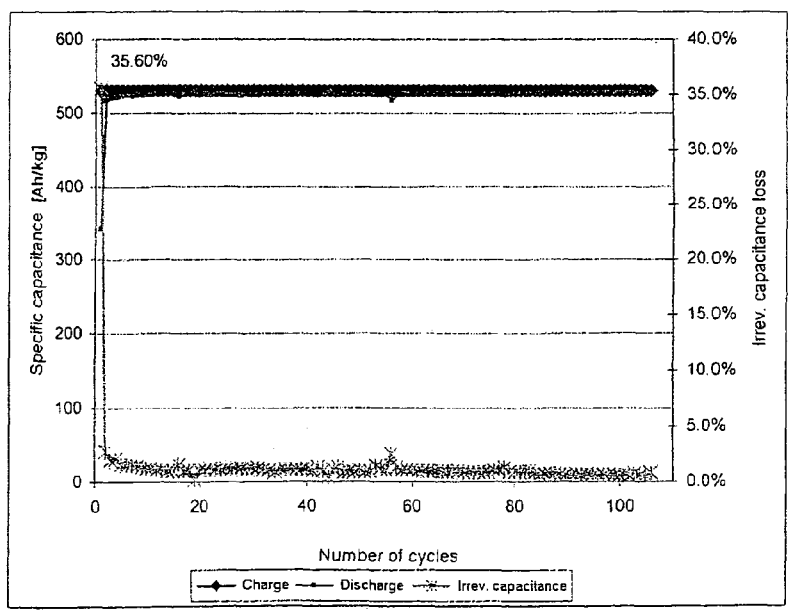

| Example | Electrode material | Rolled electrode | Electrolyte | For x mAh/g capacitance-limited cycles with y mA/g | | Also see |
|---|---|---|---|---|---|---|
| | | | | x | y | |
| B3 | EM_Si1_80 | | EL1 | 1000 | 74 | FIG. 5 |
| B4 | EM_Si1_80 | | EL1 | 700[1] | 372 | FIG. 6 |
| B5 | EM_Si2_80 | X | EL1 | 700 | 372 | FIG. 7 and 8 |
| B6 | EM_Si3_80 | | EL1 | 700 | 372 | FIG. 9 |
| B7 | EM_SiB4_60 | X | EL1 | 700 | 372 | FIG. 10 |
| B8 | EM_Si2_80 | X | EL2 | 700 | 150 | FIG. 11 |
| B9 | EM_Si1_80 | | EL3 | 700 | 150 | FIG. 12 |
| B10 | EM_Si1_20 | | EL1 | 530[2] | 50 | FIG. 13 |
| B11 | EM_Si2_20 | | EL1 | 530[2] | 50 | FIG. 14 |

[1]approximately twice the graphite capacitance
[2]approximately 1.5 times the graphite capacitance The electrode material according to the invention which is used in examples B1 has a high reversible capacitance with up to more than 1000 mAh/g and a stability which persists over 50 cycles. However, a relatively high irreversible capacitance is observed in the first cycle. Example B2 shows very stable behavior, a very high capacitance, slight fading and a relatively low irreversible capacitance especially in the first cycle, in which it is only 26%. Examples B3 and B4 show that the electrode material according to the invention permits a stable cycle with more than 80 or more than 100 cycles when the capacitance is limited. These examples show that the cycle stability of the electrode material according to the invention is higher than for the silicon-based electrode materials described in the literature; this also applies to the reversible capacitance achieved. In addition, the irreversible capacitance loss is also small at about 1.5% per cycle. Example B5 shows a stable cycle even over 200 cycles. Furthermore, FIG. 6 shows that a good current-carrying capacity is achieved here using the electrode material according to the invention, which capacity is approximately in the region of classical electrode materials. A stable cycle for over 150 cycles is also indicated by example B6; here, somewhat lower irreversible losses are observable in comparison with the other electrode materials according to the invention at higher numbers of cycles, which losses, however, are higher in the first cycles. Example B7 likewise shows a stable cycle; here, the irreversible losses at higher numbers of cycles are somewhat higher than in the case of the other electrode materials according to the invention which are used in the examples. A stable cycle over 20 cycles is indicated by example B8, but higher irreversible losses occur here, which are due to the use of an electrolyte without the film-forming additive vinylene carbonate. Example B9 shows a stable cycle over more than 130 cycles. The slightly higher irreversible losses occur in the first cycles, but only very small irreversible losses at higher numbers of cycles. A very stable cycle over more than 180 cycles with a lower irreversible capacitance from the second cycle is indicated by example B10. Very stable cycles with a low irreversible capacitance from the second cycle are also observable in example 11.

7. Testing a Full Cell

Figure 15:
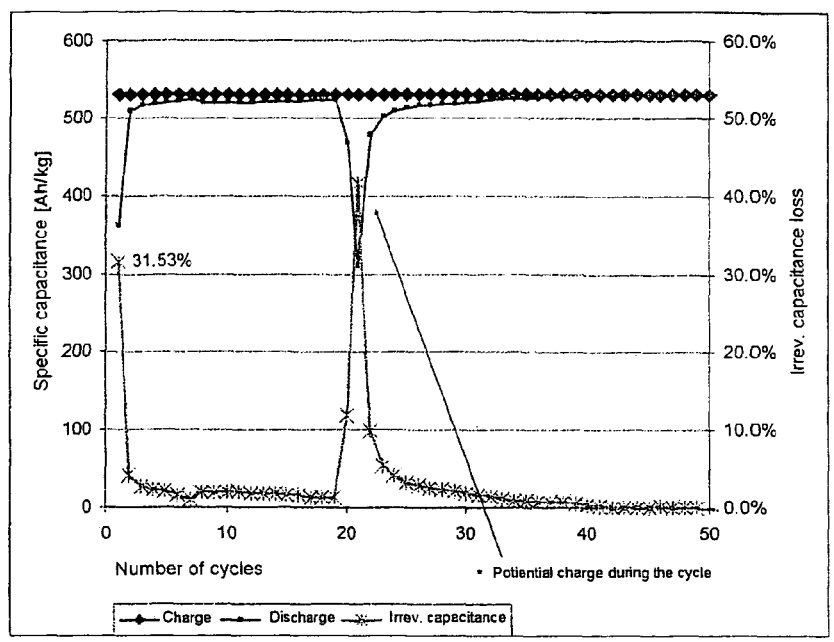

The cycle is effected in a full cell against an $LiCoO_2$ electrode. In this example (shown in FIG. 15) the operation of a complete battery using the electrode material EM_Si2__80 according to the invention and the electrolyte EL1 is tested. The full cell was operated in a mode capacitance-limited to 530 mA/g with cycles with 372 mA/g. The temporary decrease and the increase again of the capacitance are based on the subsequent raising of the upper cut-out potential from 4.0 to 4.2 V. The measurement fulfills the operability of this full cell up to over 50 cycles, with relatively small irreversible losses.

The invention claimed is:

1. An electrode material for lithium ion batteries, comprising
   5-85% by weight of nanoscale silicon aggregate particles which have a BET surface area of from 5 to 700 $m^2/g$ and a mean primary particle diameter of from 5 to 200 nm,
   0-10% by weight of conductive carbon black,
   5-80% by weight of graphite having a mean particle diameter of from 1 μm to 100 μm and
   5-25% by weight of a binder,
   the proportions of the components summing to not more than 100% by weight.

2. The electrode material according to claim 1, wherein said electrode material comprises
   65-86.5% by weight of nanoscale silicon aggregate particles,
   0.5-5% by weight of conductive carbon black,
   8-20% by weight of graphite having a mean particle diameter of from 2 μm to 50 μm and
   5-10% by weight of a binder.

3. The electrode material according to claim 1, wherein said electrode material comprises
   5-40% by weight of nanoscale silicon aggregate particles,
   55-85% by weight of graphite having a mean particle diameter of from 2 μm to 50 μm and
   5-10% by weight of a binder.

4. The electrode material according to claim 1, wherein said nanoscale silicon aggregate particles are doped.

5. The electrode material according to claim 4, wherein said nanoscale silicon aggregate particles comprise not more than 53% by weight of lithium as a doping component.

6. The electrode material according to claim 1, wherein said nanoscale silicon aggregate particles have a BET surface area of from 6 to 140 $m^2/g$.

7. A method of preparing a lithium ion battery comprising assembling with an electrode material according to claim 1.

8. The method according to claim 7, wherein said lithium ion battery comprises an electrolyte composition which comprises from 0.5 to 10% by weight of vinylene carbonate.

9. The method according to claim 7, wherein said lithium ion battery comprises an electrolyte composition comprising at least one organic solvent and at least one alkali metal salt or alkaline earth metal salt.

10. The method according to claim 9, wherein said organic solvent is at least one organic solvent selected from the group consisting of ethylene carbonate, dimethyl carbonate, ethyl methyl carbonate, diethyl carbonate, propylene carbonate, butylene carbonate, methyl propyl carbonate, butyl methyl carbonate and its isomers, 1,2 dimethoxyethane, tetrahydrofuran, 2 methyltetrahydrofuran, diethylene glycol dialkyl ester, dioxolane, propylene oxide, dimethyl sulfoxide, dimethylformamide, formamide, nitromethane, gamma-butyrolactone, alkyl esters of carboxylic acids and/or methyl lactate.

11. The method of using according to claim 9, wherein said electrolyte composition comprises at least one alkali metal salt selected from the group consisting of $LiPF_6$, $LiClO_4$, $LiAsF_6$, $LiBF_4$, $LiCF_3SO_3$, $LiN(CF_3SO_2)_2$, $LiN(SO_2CF_2CF_3)_2$, $LiSbF_6$, $LiAlCl_4$, $LiGaCl_4$, $LiCl$, $LiNO_3$, $LiSCN$, $LiO_3SCF_2CF_3$, $LiC_6F_5SO_3$, $LiO_2CCF_3$, $LiFSO_3$, $LiB(C_6H_5)_4$, $LiB(C_2O_4)_2$, and/or lithium fluoroalkylphosphates.

12. The method of using according to claim 7, wherein said lithium ion battery comprises an electrolyte composition in which the concentration of a conductive salt is from 0.5 mol/l to the solubility limit of the corresponding salt.

13. A lithium ion battery having a negative electrode which comprises an electrode material according to claim 1.

14. The electrode material according to claim 1, wherein a conductive carbon black is present in an amount of 0.5 to 4% by weight.

15. The electrode material according to claim 1, wherein a conductive carbon black is present and has a mean particle size of from 20-60 nm.

16. The electrode material according to claim 1, wherein a conductive carbon black is present and has a BET surface area of from 50 to 80 $m^2/g$.

17. The electrode material according to claim 1, wherein said graphite has a $d_{90}$ value of from 5 to 10 μm.

18. The electrode material according to claim 1, wherein said graphite has a BET surface area of from 5 to 30 $m^2/g$.

* * * * *